Sept. 19, 1933. H. LÖFQUIST 1,927,240
PROCESS FOR METALLURGICAL CONCENTRATION OF RAW MATERIAL
Filed Nov. 10, 1930
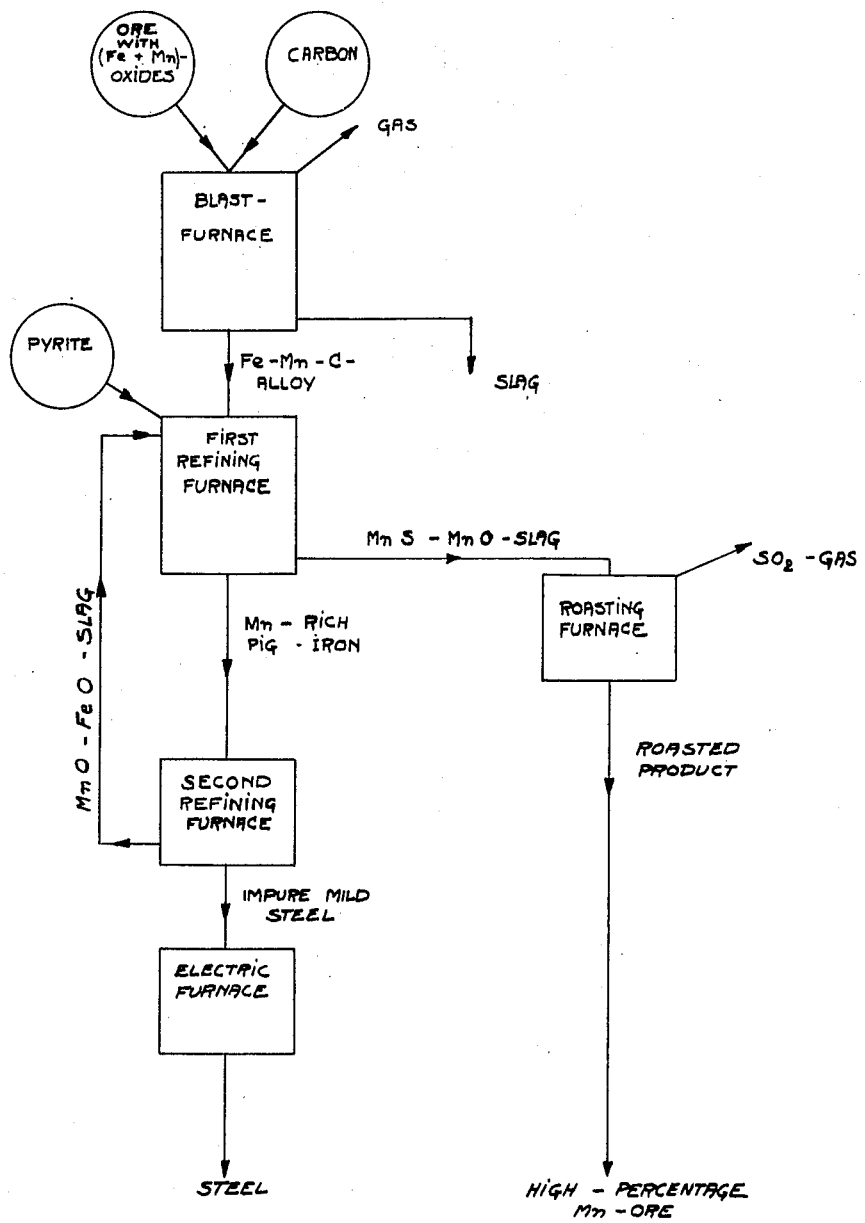
Inventor:-
Helge Löfquist
by Langner, Parry, Card & Langner
Attys.

UNITED STATES PATENT OFFICE 1,927,240

PROCESS FOR METALLURGICAL CONCENTRATION OF RAW MATERIAL

Helge Löfquist, Stockholm, Sweden

Application November 10, 1930, Serial No. 494,772, and in Sweden November 18, 1929

38 Claims. (Cl. 75—45)

The object of the present invention is to concentrate one or more certain metals, here called concentrate metals, possessing a relatively great affinity for oxygen, from ores or other oxide compounds in which this metal or these metals are present as oxides—or silicates—together with oxides, or silicates, of one or more other metals, having less affinity for oxygen, here called dilution metals, which in a molten condition alloy with the first mentioned metals, difficult of reduction. This process is especially intended for metals, the oxides of which have such a high melting point that they are difficult of fusion, or unfusible at the temperatures which prevail during the ordinary metallurgical steel manufacturing processes.

In earlier methods for concentrating such metals the following approximate manner of proceeding has been used.

The ore in question is first reduced by means of a sufficient amount of carbon or other reducing agent for instance in a blast furnace. Hereby a metal melt is obtained holding a considerable amount of metals of the oxides easy of reduction, dilution metals, alloyed with a certain amount of metals of the oxides difficult of reduction, together with slag from the unreduced gangue and the additions made. The liquid metal, obtained in this way, is then subjected to an oxidation process, for instance one of the ordinary metallurgical refining processes. Hereby the metals which have a greater affinity for oxygen become oxidized and slagged at first, while the metals with less affinity for oxygen become oxidized only to a less degree, and mostly remain in the metal melt. This refining slag will thus contain the metal or metals with a greater affinity for oxygen concentrated as oxide, and the slag should be poured before too great an amount of the metals with less affinity for oxygen will have time to oxidize and join the slag with a resulting lowering of the concentration of the concentrate metal or metals. The realization of these processes requires a very fluid slag. If it becomes viscous or if unmelted products are formed in the slag on account of a high melting point of the oxides obtained, the realization of the process will be difficult and a poor yield of metal will result. On account of the circumstances stated the application of these methods has therefore also been very restricted. The object of the present process is to obtain a slag rich in concentrate metal with a low melting point. This is effected by one of the following processes.

The metal melt is superoxidized so that besides practically the whole amount of the concentrate metal or metals, also a certain amount of the metals with less affinity for oxygen, the dilution metals, becomes oxidized. The result will be a slag with low melting point and viscosity but which has a low concentration of the concentrate metal. This diluted slag is therefore reduced with a new metal melt, containing one or more of the metals intended for the concentration. This or these metals will then join the slag and replace one or more of the dilution metals, easy of reduction, which in their turn pass over into the metal melt. The raising of the melting point and the increase in viscosity which would ensue of this concentration in the slag of one or more of the oxides difficult of fusion is counteracted by adding sulphur in the shape of pure sulphur, iron pyrite, pyrrhotine or some other sulphide with a relatively low heat of formation.

The fact that the sulphide which is added to the slag must have a low heat of formation signifies that the affinity for sulphur of the concentrate metal or metals must be greater than that of the metal which forms this sulphide. This, together with the great affinity for oxygen of the concentrate metal or metals involves that the oxide slag containing sulphide—before the reduction with fresh metal melt having a relatively low content of concentrate metal—will after this reduction mainly consist of a relatively easily fusible mixture of oxide and sulphide of the concentrate metal or metals. In several cases the oxide and the sulphide of a metal form a homogeneous melt with a considerably lower melting point—and viscosity—than that of each of the two components, sulphide and oxide. By an adequate choice of the proportion between sulphide and oxide a minimum of melting temperature may be obtained, corresponding to that of the eutectic mixture. As an example may be stated that ferrous sulphide, FeS, melts at 1193° C. and ferrous oxide, FeO, at 1370° C. while a mixture consisting of 42% FeO and 58% FeS melts into a homogeneous slag already at 940° C. Similar conditions are prevailing for instance in the case of sulphide and oxide of manganese and of aluminium.

The amount of concentrate metal or metals which passes into the slag during the reduction of the dilute oxide-sulphide slag with a fresh metal melt is in first hand determined by the amount of oxygen and sulphur available in the slag for uniting with the concentrate metal or metals, or in other words by the original content in the slag of reducible dilution oxide and of sulphide with a low heat of formation.

As the concentrate metal or metals in this way pass into the slag a corresponding amount of the metal of the dilution oxide and the metal in the added sulphide will be expelled and pass into the metal melt. A certain equilibrium will be reached here, involving that a certain amount of the concentrate metal or metals remains in the metal melt, in equilibrium with the same metal or metals, combined with sulphur and oxygen in the slag. The greater the affinity for oxygen and sulphur of the concentrate metal or metals, the stronger will be the concentration hereof in the slag, that is to say the less will remain in the melt when equilibrium has been reached. The easily fusible slag, obtained in this way, is poured off and treated in a manner which will be described below for extracting the metal.

Another way of proceeding is to have the sulphur or the sulphide added all the time during the refining of the metal melt in order to obtain a low melting point of the slag without having to superoxidize the melt and to dilute the slag with oxide of an undesired metal. This, however, entails the risk of considerable losses in sulphur during the refining, and besides, it would probably even here be necessary—in order to secure a quantitatively satisfactory recovery of concentrate metal into the sulphide-oxide slag—to oxidize the metal melt so far that part of the metal or metals with less affinity for oxygen became oxidized. Hereby the slag would become somewhat diluted which would probably even here necessitate a subsequent reduction of the slag with a fresh metal melt. But if this proceeding could be applied without too great a loss of sulphur, and without too great a dilution of the refining slag obtained with a non-desired oxide, it would very likely be preferable, as in this case no final reduction of the slag is required.

A comparison between these proceedings however shows the advantage of the first method with superoxidizing of the metal melt, followed by a reduction of the slag obtained in the cited manner, inasmuch as on the one hand the content of the concentrate metal or metals in the metal melt will be lowered before the final refining, rendering a lesser slag volume content during the final refining, and an increased possibility of obtaining a quantitative gain from the concentrate metal or metals into the slag, and secondly that the concentration of this metal or metals in the final slag, reduced by the second metal melt, will be very high—practically the very highest possible when the erosion of the furnace lining and hereby the admixture of refractory material is taken into consideration.

The concentrated final slag obtained may then for instance be roasted in air—with an eventual recovering of the sulphur dioxide formed—to be entirely transformed into high-percentage oxide. Even other methods applied for extracting metal from ores containing sulphur may be applicable here.

Seeing that manganese has a great affinity for sulphur as well as oxygen as compared to iron, and its sulphide and oxide further being completely mixable in a molten condition, this proceeding may also be applied in order to extract a product rich in manganous oxide from iron ore containing manganese, the manganese content of which however is too low to enable a winning out—by way of direct reduction—of a high-percentage alloy.

Let us assume that the reduction in a blast furnace of a charge of such an ore renders for instance a spiegel iron with 14% manganese. This iron may then be refined for instance in a basic Bessemer converter or in an open-hearth furnace, and will then after a certain time render a refining slag mainly consisting of manganous oxide, MnO, the melting point of which is high, the slag being consequently viscous. In order to lower the melting point and the viscosity, sulphurous materials may be added already before, or during the refining which however entails a certain danger of some sulphur being oxidized and eliminated as gas. Such a loss of S is considerably lessened by not adding any S during the refining process but instead bringing about the required lowering of the melting point and viscosity of the slag by means of superoxidizing the melt so that a certain amount of ferrous oxide is obtained in the slag. This dilute slag may then be reduced with a fresh amount of unrefined spiegeliron melt during the addition of S in the shape of some sulphide with a low heat of formation, for instance FeS or $FeS_2$. The FeO and FeS of the slag will then be reduced by the Mn of the spiegeliron melt into MnO and MnS, which together with MnO already present, render an easily fusible Mn-sulphide-oxide slag. Hereby S is not subjected to any oxidation, and the losses will therefore not be great.

The practical performance of the process in such a case would for instance be the following.

A certain amount of the pig iron, containing Mn, or the spiegeliron, with an Mn-content of 14%, a certain low Si-content, and generally a certain content of P, the ores mentioned often holding a fair amount of P, is at first subjected to a pre-refining according to the following, and is then subjected to a final refining without any addition of sulphur, until the slag has a composition of for instance 45% MnO, 45% FeO, 7% $SiO_2$ and the balance being $P_2O_5$, CaO, etcetera. Thanks to the high content of FeO the melting point as well as the viscosity of this slag is fairly low, and it may be poured from the metal. In order to lower the contents of Fe and P this slag is then reduced with a fresh, equally large charge of pig iron rich in Mn, or spiegeliron, in a furnace with neutral or slightly reducing atmosphere. This corresponds to the above-mentioned pre-refining of the spiegel-iron melt. The Mn of the spiegel-iron and some of its C hereby reduce the FeO and $P_2O_5$ of the refining slag, whereby P and Fe enter into the metal, the Mn passing into the slag as MnO. If no additions were made to the slag with the view of lowering the melting point the melting point and viscosity of the slag would rise, rendering the process more difficult. By means of adding S, for instance as FeS, MnS is formed, together with MnO rendering an easily fusible slag. Hereby a low melting point and a low viscosity is maintained until almost all Fe has been reduced from the slag.

In consequence of equilibrium conditions of sulphides and oxides of manganese and iron in relation to the metals, studied by me, an approximate composition of the final slag obtained in this way may be stated as: 45% MnO, 45% MnS, 7% $SiO_2$, slight contents of FeO, FeS, $P_2O_5$ etcetera. The viscosity of this slag is very low. Such a high Mn-content may well be expected, as the slag at the end of the reduction stands in contact with molten metal with a remaining Mn-content of several per cents. With the assumed metal- and slag analyses the remaining Mn-content of the metal will be about 6%, under the presumption made that the fresh spiegeliron melt, which reduced the slag rich in FeO, has the same weight as the metal melt from which the slag has been obtained. The slag rich in Mn is poured and is subjected to a further treatment, for instance roasting with a subsequent reduction with the view of obtaining the Mn in a high percentage Fe-alloy.

Naturally, other methods used for extracting metal from ores containing sulphur may also be applicable.

The metal melt which is pre-refined with the slag containing S is then completely refined in the manner described above, rendering a refining slag which is then in due order treated with a fresh charge of unrefined spiegeliron, and so forth. For this example see the schema in the drawing.

Summarizing the entire concentration process in this case we may state that the superoxidizing of the metal melt during the final refining enables almost a quantitative extraction of Mn from the metal, the spiegeliron, as oxide in a very liquid but dilute slag. By using this slag for the pre-refining of a fresh spiegeliron melt, with a simultaneous addition of some sulphide with a low heat of formation this dilute slag will be converted into a slag very rich in Mn, retaining its low melting point and viscosity. It should be remarked however, that a successive concentration of P will take place in the subsequent slags, as P wanders from the finally refined metal to the slag, and from this to the pre-refined metal, thus accumulating in the slag. When the P-content grows too high the concentrated final slag must be subjected to a final after-reduction for instance with C, in order to lower the P-content. The metal melt is then subjected to a further treatment into steel.

For the processes described above the furnaces utilized in the ordinary metallurgical refining processes may be applied. Different combinations of furnaces may be used for carrying out the different partial processes. A few examples may be given. A basic lining must be used in all cases.

(a) A Bessemer converter may be used for the final refining of the metal melt; after-reduction of the refining slag may be brought about in a reverberatory furnace, or in an openhearth furnace, with a slightly reducing atmosphere, in an electrical arc furnace or in an electrical induction furnace.

(b) An open-hearth furnace may be used for the final refining of the metal melt; after-refining of the refining slag may be effected in any of the furnaces given under (a), in a manner indicated there.

(c) One and the same open-hearth furnace may be used for the final refining of the metal melt and for the reduction of the refining slag with a fresh melt, according to the following. After having been finally refined in an open-hearth furnace the metal is poured, while the slag remains in the furnace. To this slag sulphur or sulphide with low heat of formation is added together with some fresh metal melt, which reduces the content in the slag of elements with less affinity for oxygen and sulphur, the atmosphere of the furnace hereby being slightly reducing. The slag is then poured off while the metal melt, now prerefined, remains in the furnace to be subjected to a final refining with ore in an oxidizing atmosphere etcetera.

Other kinds of furnaces and combinations may also be applied.

Further, it is evidently not necessary to reduce the dilute refining slag with fresh, unreduced metal melt. Other reducing agents may also be used. Thus, a metal melt, containing one or several metals, other than those occurring in the first mentioned melt may quite well be used as a reducing agent, provided the affinity for oxygen of these metals is sufficiently high.

With regard to the treatment of the slag containing sulphur it may be noted that if this slag contains approximately equal parts of MnS and MnO and small amounts of other elements a burning of the MnS by way of oxidation in a converter with surface blowing gives a sufficient rise in the temperature to render a slag mainly consisting of MnO so fluid that it may be poured off from the converter.

Having now described my invention, what I claim as new and desire to secure by Letters Patent is:

1. The process of treating alloys containing iron and manganese comprising concentrating the manganese in a slag containing oxygen and sulphur and leaving the iron in a metal melt having a lower content of manganese than that of the alloy, by smelting the alloy with ingredients containing oxygen and sulphur not more strongly chemically combined than in manganous oxide and manganese sulfide respectively and separating the slag rich in manganese from the iron-containing metal melt.

2. The process of treating alloys containing iron and manganese comprising concentrating the manganese in a slag containing oxygen and sulphur and leaving the iron in a metal melt having a lower content of manganese than that of the alloy, by smelting the alloy with ingredients containing oxygen and sulphur not more strongly chemically combined than in manganous oxide and manganese sulfide respectively and separating the slag rich in manganese from the iron-containing metal melt and then recovering the manganese from the slag.

3. The process of treating alloys containing iron and manganese comprising concentrating the manganese in a slag containing oxygen and sulphur and leaving the iron in a metal melt having a lower content of manganese than that of the alloy, by smelting the alloy with ingredients containing oxygen and sulphur not more strongly chemically combined than in manganous oxide and manganese sulfide respectively, the amounts of these ingredients being such that practically all of the manganese of the alloy is concentrated in the slag and separating the slag rich in manganese from the iron-containing metal melt.

4. In the process as claimed in claim 3, smelting the alloy with an oxide having a heat of formation not higher than that of manganous oxide and with one or more metallic sulphides.

5. In the process as claimed in claim 3, smelting the alloy with one or more oxides and with one or more metallic sulphides having a heat of formation not higher than that of manganese sulphide.

6. In the process as claimed in claim 3, smelting the alloy with oxide of iron and sulphide of iron.

7. The process of treating alloys containing iron and manganese comprising concentrating the manganese in a slag containing oxygen and sulphur and leaving the iron in a metal melt having a lower content of manganese than that of the alloy, by smelting the alloy with ingredients containing oxygen and sulphur not more strongly chemically combined than in manganous oxide and manganese sulfide respectively, the amounts of these ingredients being such that practically all of the manganese of the alloy is concentrated in the slag and reducing the amount of iron in the slag by adding a reducing agent and separating the slag rich in manganese from the iron-containing metal melt.

8. The process of treating alloys containing iron and manganese comprising concentrating the manganese in a slag containing oxygen and sulphur and leaving the iron in a metal melt having a lower content of manganese than that of the alloy, by smelting the alloy with ingredients containing oxygen and sulphur not more strongly chemically combined than in manganous oxide and manganese sulfide respectively, the amounts of these ingredients being such that practically all of the manganese of the alloy is concentrated in the slag, and reducing the amount of iron in the slag by adding a reducing agent and separating the slag rich in manganese from the iron-containing metal melt and then recovering the manganese from the slag.

9. The process of treating alloys containing iron and manganese comprising concentrating the manganese in a slag containing oxygen and sulphur and leaving the iron in a metal melt, having a lower content of manganese than that of the alloy, by smelting the alloy with ingredients containing oxygen and sulphur not more strongly chemically combined than in manganous oxide and manganese sulfide respectively, the amounts of these ingredients being such that practically all of the manganese of the alloy is concentrated in the slag, and separating the slag rich in manganese from the iron-containing metal melt and reducing the amount of iron in the slag by adding a reducing agent.

10. The process of treating alloys containing iron and manganese comprising concentrating the manganese in a slag containing oxygen and sulphur and leaving the iron in a metal melt having a lower content of manganese than that of the alloy, by smelting the alloy with ingredients containing oxygen and sulphur not more strongly chemically combined than in manganous oxide and manganese sulfide respectively, the amounts of these ingredients being such that practically all of the manganese of the alloy is concentrated in the slag, and separating the slag rich in manganese from the iron-containing metal melt and reducing the amount of iron in the slag by adding a reducing agent and then recovering the manganese from the slag.

11. In the process as claimed in claim 7, smelting the alloy with an oxide having a heat of formation not higher than that of manganous oxide and with one or more metallic sulphides.

12. In the process as claimed in claim 7, smelting the alloy with an oxide and with one or more sulphides having a heat of formation not higher than that of manganese sulphide.

13. In the process as claimed in claim 7, smelting the alloy with oxide of iron and sulphide of iron.

14. In the process as claimed in claim 8, smelting the alloy with an oxide having a heat of formation not higher than that of manganous oxide and with one or more metallic sulphides.

15. In the process as claimed in claim 8, smelting the alloy with an oxide and with one or more sulphides having a heat of formation not higher than that of manganese sulphide.

16. In the process as claimed in claim 8, smelting the alloy with oxide of iron and sulphide of iron.

17. In the process as claimed in claim 9, smelting the alloy with an oxide, having a heat of formation not higher than that of manganous oxide and with one or more metallic sulphides.

18. In the process as claimed in claim 9, smelting the alloy with an oxide and with one or more metallic sulphides having a heat of formation not higher than that of manganese sulphide.

19. In the process as claimed in claim 9, smelting the alloy with oxide of iron and sulphide of iron.

20. In the process as claimed in claim 10, smelting the alloy with an oxide, having a heat of formation not higher than that of manganous oxide and with one or more metallic sulphides.

21. In the process as claimed in claim 10, smelting the alloy with an oxide and with one or more metallic sulphides having a heat of formation not higher than that of manganese sulphide.

22. In the process as claimed in claim 10, smelting the alloy with oxide of iron and sulphide of iron.

23. The process of treating alloys containing iron and manganese comprising concentrating manganese in a slag containing oxygen and sulphur and leaving the iron in a metal melt having a lower content of manganese than that of the alloy, by smelting the alloy with ingredients containing oxygen and sulphur not more strongly chemically combined than in manganous oxide and manganese sulfide respectively, the amounts of these ingredients being such that a certain amount of manganese is left in the metal melt, and separating the slag rich in manganese from the iron-containing metal melt.

24. The process of treating alloys containing iron and manganese comprising concentrating manganese in a slag containing oxygen and sulphur and leaving the iron in a metal melt, having a lower content of manganese than that of the alloy, by smelting the alloy with ingredients containing oxygen and sulphur not more strongly chemically combined than in manganous oxide and manganese sulfide respectively, the amounts of these ingredients being such that a certain amount of manganese is left in the metal melt and separating the slag rich in manganese from the iron-containing metal melt and then recovering manganese from the slag.

25. The process of treating alloys containing iron and manganese comprising concentrating manganese in a slag containing oxygen and sulphur and leaving the iron in a metal melt having a lower content of manganese than that of the alloy, by smelting the alloy with ingredients containing oxygen and sulphur not more strongly chemically combined than in manganous oxide and manganese sulfide respectively, the smelting being effectuated in two stages in such a way that in the first stage the amounts of oxide and sulphide yielding ingredients are such that a certain amount of manganese is left in the metal melt and in the second stage this metal melt is oxidized so far that its amount of manganese is oxidized practically completely giving an oxide slag containing manganese and iron, and this slag being used as an oxide yielding ingredient in the smelting of another charge of alloy with oxide and sulphide yielding ingredients and separating the slag rich in manganese obtained in the first stage, from the iron-containing metal melt.

26. The process of treating alloys containing iron and manganese comprising concentrating the manganese in a slag, containing oxygen and sulphur and leaving the iron in a metal melt having a lower content of manganese than that of the alloy, by smelting the alloy with ingredients containing oxygen and sulphur not more strongly chemically combined than in manganous oxide and manganese sulfide respectively, the smelting being effectuated in two stages in such a way that in the first stage the amounts of oxide and sulphide yielding ingredients are such that a certain amount of manganese is left in the metal melt and in the second stage this metal melt is further oxidized so far that its amount of manganese is practically completely oxidized, giving an oxide slag, containing manganese and iron and this slag being used as an oxide-yielding ingredient in the smelting of another charge of alloy with oxide and sulphide yielding ingredients and separating the slag rich in manganese, obtained in the first stage, from the iron-containing metal melt and then recovering manganese from the slag.

27. In the process as claimed in claim 23, smelting the alloy with an oxide having a heat of formation not higher than that of manganous oxide and with one or more metallic sulphides.

28. In the process as claimed in claim 23, smelting the alloy with an oxide and with one or more metallic sulphides having a heat of formation not higher than that of manganese sulphide.

29. In the process as claimed in claim 23, smelting the alloy with oxide of iron and sulphide of iron.

30. In the process as claimed in claim 24, smelting the alloy with an oxide having a heat of formation not higher than that of manganous oxide and with one or more metallic sulphides.

31. In the process as claimed in claim 24, smelting the aloy with an oxide and with one or more metallic sulphides having a heat of formation not higher than that of manganese sulphide.

32. In the process as claimed in claim 24, smelting the alloy with oxide of iron and sulphide of iron.

33. In the process as claimed in claim 25, smelting the aloy with an oxide having a heat of formation not higher than that of manganous oxide and in the first stage, besides such oxide or oxides, also with a metallic sulphide.

34. In the process as claimed in claim 25, smelting the alloy with an oxide and in the first stage, besides such oxide also with a metallic sulphide, having a heat of formation not higher than that of manganese sulphide.

35. In the process as claimed in claim 25, smelting the alloy with oxide of iron and in the first stage, besides such oxide, with sulphide of iron.

36. In the process as claimed in claim 26, smelting the alloy with an oxide having a heat of formation not higher than that of manganous oxide, and in the first stage, besides such oxide or oxides, also with a metallic sulphide.

37. In the process as claimed in claim 26, smelting the alloy with an oxide and in the first stage, besides such oxide or oxides, also with a metallic sulphide having a heat of formation not higher than that of manganese sulphide.

38. In the process as claimed in claim 26, smelting the alloy with oxide of iron and in the first stage, besides such oxide, with sulphide of iron.

HELGE LÖFQUIST.